United States Patent
Essawy et al.

(10) Patent No.: US 10,782,406 B2
(45) Date of Patent: Sep. 22, 2020

(54) LONG-RANGE CLOUD CONDITIONS DETECTOR

(71) Applicant: Rosemount Aerospace Inc., Burnsville, MN (US)

(72) Inventors: Magdi A. Essawy, Lakeville, MN (US); Darren G. Jackson, Prior Lake, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 903 days.

(21) Appl. No.: 15/141,466

(22) Filed: Apr. 28, 2016

(65) Prior Publication Data

US 2017/0315233 A1 Nov. 2, 2017

(51) Int. Cl.
*G01S 13/95* (2006.01)
*G01S 7/02* (2006.01)
(Continued)

(52) U.S. Cl.
CPC ............ *G01S 13/953* (2013.01); *G01S 7/024* (2013.01); *G01S 7/025* (2013.01); *G01S 13/24* (2013.01); *G01S 2013/0254* (2013.01)

(58) Field of Classification Search
None
See application file for complete search history.

(56) References Cited

U.S. PATENT DOCUMENTS 4,193,075 A * 3/1980 Blazek .................. G01S 1/08
342/398

6,377,202 B1 * 4/2002 Kropfli .................. G01S 7/024
342/26 R
(Continued)

FOREIGN PATENT DOCUMENTS

EP 2184232 A1 5/2010
EP 2518529 A2 10/2012
(Continued)

OTHER PUBLICATIONS

Radar Handbook, Skolnik, M., 3rd edition, 2008; McGraw-Hill. Relevent portions of this 1352 page document were copied to a seperate smaller file included here. (Year: 2008).*
(Continued)

*Primary Examiner* — Erin F Heard
*Assistant Examiner* — Donald H B Braswell
(74) *Attorney, Agent, or Firm* — Kinney & Lange, P.A.

(57) ABSTRACT

Apparatus and associated methods relate to detecting cloud conditions from a distance by generating a polarized microwave-frequency electromagnetic pulse and evaluating various reflected wave parameters pertaining to a corresponding cloud-reflected microwave-frequency electromagnetic reflection. Various cloud metrics can be calculated using these collected wave parameters. The microwave-frequency pulses can be scanned over multiple dimensions, using a steered beam arrangement which will lead to the ability to scanning a conical sector of the space in front of the aircraft. These collected multi-dimensional wave parameters can then be used to generate multi-dimensional maps of cloud metrics. Such cloud metrics can include relative velocities of moving cloud conditions in the flight direction, particle density distributions, ice/water ratios, estimates of particle side distributions, etc.

20 Claims, 5 Drawing Sheets

(51) Int. Cl.
G01S 13/24 (2006.01)
G01S 13/02 (2006.01)

(56) References Cited

U.S. PATENT DOCUMENTS

| | | |
|---|---|---|
| 6,377,204 B1 | 4/2002 | Wurman et al. |
| 6,819,265 B2 | 11/2004 | Jamieson et al. |
| 7,242,343 B1 * | 7/2007 | Woodell .................... G01S 7/41 |
| | | 342/26 B |
| 7,365,696 B1 * | 4/2008 | Smeltzer ................. H01Q 3/02 |
| | | 342/359 |
| 7,982,658 B2 | 7/2011 | Kauffman et al. |
| 8,144,325 B2 | 3/2012 | Ray et al. |
| 9,188,700 B2 | 11/2015 | Bunch et al. |
| 9,689,984 B1 * | 6/2017 | Breiholz ............... G01S 13/953 |
| 2011/0313722 A1 * | 12/2011 | Zhu ....................... G01S 17/933 |
| | | 702/159 |

FOREIGN PATENT DOCUMENTS

| | | |
|---|---|---|
| EP | 2587278 A1 | 5/2013 |
| EP | 2860548 A1 | 4/2015 |

OTHER PUBLICATIONS

Extended European Search Report, for European Patent Application No. 17168694.2, dated Oct. 9, 2017, 9 pages.

\* cited by examiner

LONG-RANGE CLOUD CONDITIONS DETECTOR

BACKGROUND

Unknown severe weather/atmospheric conditions can present risks to aircraft when traveling through them. Ice accretion may cause aircraft stall or unpredictable aircraft control variation that might lead to flight issues. When in a cloud, ice can form on control surfaces and/or lift surfaces. When aircraft engines ingest excessive moisture and/or ice, the chemistry of combustion can change, and fluid pathways might become clogged. Large ice particles can be abrasive to exposed surfaces of aircraft engines. And very large ice particles can even damage aircraft engines and/or cause major engine performance changes. Not every cloud, however, presents these hazards to an aircraft. Different clouds and different atmospheric conditions may be accompanied by various water droplet size distributions, different ice/liquid ratios, etc., some of which may be entirely safe to an aircraft, and others may not be safe. Such water droplet size distributions and ice/liquid ratios may be measured as cloud metrics using various research type instruments.

Many aircraft might be equipped with variations of such instruments to detect and/or measure some cloud metrics. These detected and measured cloud metrics may be used to predict whether a particular cloud can have conditions conducive to ice formation on control or lift surfaces. Such cloud metrics may even be used to predict the location(s) on the aircraft where such ice formation could be expected. Such equipment has a limited range and applicability, though. Such equipment can be used when an aircraft is in a cloud, but not when the aircraft is a great distance from the cloud.

Large aircraft might benefit from detection of severe weather conditions at a great distance. Such detection can be used for avoidance of dangerous cloud in its flight path. It can take up to one hundred miles of forewarning for a pilot to successfully avoid an upcoming cloud. Such long range forewarning of clouds, which may present one or more of the above hazards, could greatly improve aircraft travel safety.

SUMMARY

Apparatus and associated devices relate to a long-range cloud conditions detector. The long-range cloud conditions detector includes a pulse generator configured to generate an electrical emission signal. The long-range cloud conditions detector includes a polarizing antenna electrically coupled to the pulse generator. The polarizing antenna is configured to emit a polarized microwave-frequency electromagnetic pulse in response to receiving, from the pulse generator, the electrical emission signal. The polarizing antenna is configured to sense a microwave-frequency electromagnetic reflection corresponding to the emitted polarized microwave-frequency electromagnetic pulse reflected by a cloud. The microwave-frequency electromagnetic reflection has a first component of a first polarization and a second component of a second polarization different from the first polarization. The polarizing antenna is also configured to generate first and second electrical detection signals corresponding to first and second components of the sensed microwave-frequency electromagnetic reflection, respectively. The long-range cloud conditions detector includes first and second signal-processing channels, each electrically coupled to the polarizing antenna, the first and second signal-processing channels configured to receive, from the polarizing antenna, the first and second detection signals, respectively. Each of the first and second signal-processing channels include a pulse/reflection delay timer configured to generate a signal indicative of a time difference between the electrical emission signal and the received electrical detection signal. Each of the first and second signal processing channels include a signal strength module configured to generate a signal indicative of a signal strength of the received electrical detection signal. Each of the first and second signal processing channels include a decay-rate module configured to generate a signal indicative of a rate of decay of the received electrical detection signal.

In some embodiments, apparatus and associated methods relate to a method of determining conditions of a distant cloud. The method includes emitting a polarized microwave-frequency electromagnetic pulse at a cloud. The method includes sensing first and second microwave-frequency electromagnetic reflections each corresponding to the emitted polarized microwave-frequency electromagnetic pulse reflected by a cloud. The first microwave-frequency electromagnetic reflection has a first polarization and the second microwave-frequency electromagnetic reflection has a second polarization different from the first polarization. The method includes determining a time difference between the emitted polarized microwave-frequency electromagnetic pulse and the sensed first and/or second microwave-frequency electromagnetic reflections. The method includes determining signal strength of the sensed first and/or second microwave-frequency electromagnetic reflections. The method also includes determining a rate of decay of the sensed first and/or second microwave-frequency electromagnetic reflections.

DETAILED DESCRIPTION

Apparatus and associated methods relate to detecting cloud conditions from a distance by generating a polarized microwave-frequency electromagnetic pulse and evaluating various reflected wave parameters pertaining to a corresponding cloud-reflected microwave-frequency electromagnetic reflection. Various cloud metrics can be calculated using these collected wave parameters. The microwave-frequency pulses can be scanned over multiple dimensions, using a steered beam arrangement which will lead to the ability to scanning a conical sector of the space in front of the aircraft. These collected multi-dimensional wave parameters can then be used to generate multi-dimensional maps of cloud metrics. Such cloud metrics can include relative velocities of moving cloud conditions in the flight direction, particle density distributions, ice/water ratios, estimates of particle side distributions, etc.

Figure 1:
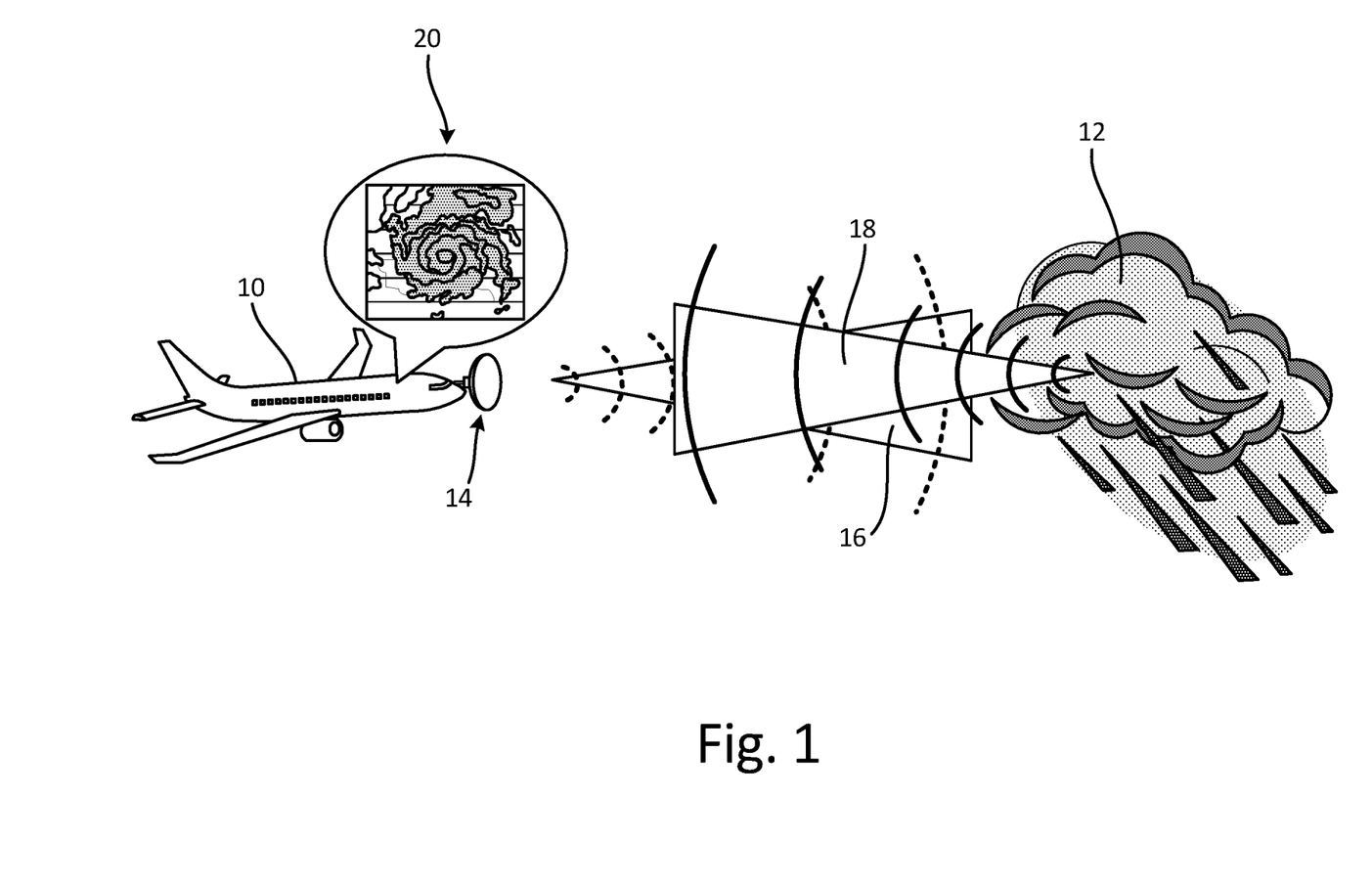
FIG. 1 is a schematic view of an aircraft using an exemplary long-range cloud conditions detector to measure various metrics of a cloud in the path of the aircraft.

FIG. 1 is a schematic view of an aircraft using an exemplary long-range cloud conditions detector to measure various metrics of a cloud in the path of the aircraft. In FIG. 1, aircraft 10 is flying on a path that will intercept cloud 12. Aircraft 10 is equipped with long-range cloud conditions detector 14. Long-range cloud conditions detector 14 generates and directs polarized microwave-frequency electromagnetic pulse 16 toward cloud 12. Polarized microwave-frequency electromagnetic pulse 16 encounters cloud 12 and a portion is reflected as microwave-frequency electromagnetic reflection 18. Microwave-frequency electromagnetic reflection 18 returns to aircraft 10 and is sensed by long-range cloud conditions detector 14. Long-range cloud conditions detector 14 then determines wave parameters of polarized electromagnetic reflection 18 and uses such determined wave parameters to calculate various cloud metrics. Long-range cloud conditions detector 14 can scan the cloud by steering the radar beam in a two-dimensional fashion so as to create cloud metric map 20 in a solid angle portion of scanned space. Cloud metric map 20 may visually present to a pilot one or more of the calculated cloud metrics in a multi-dimensional display image. Such information as displayed in cloud metric map 20 can advantageously assist a pilot in planning and/or generating a safe route either through or around cloud 12.

Figure 2:
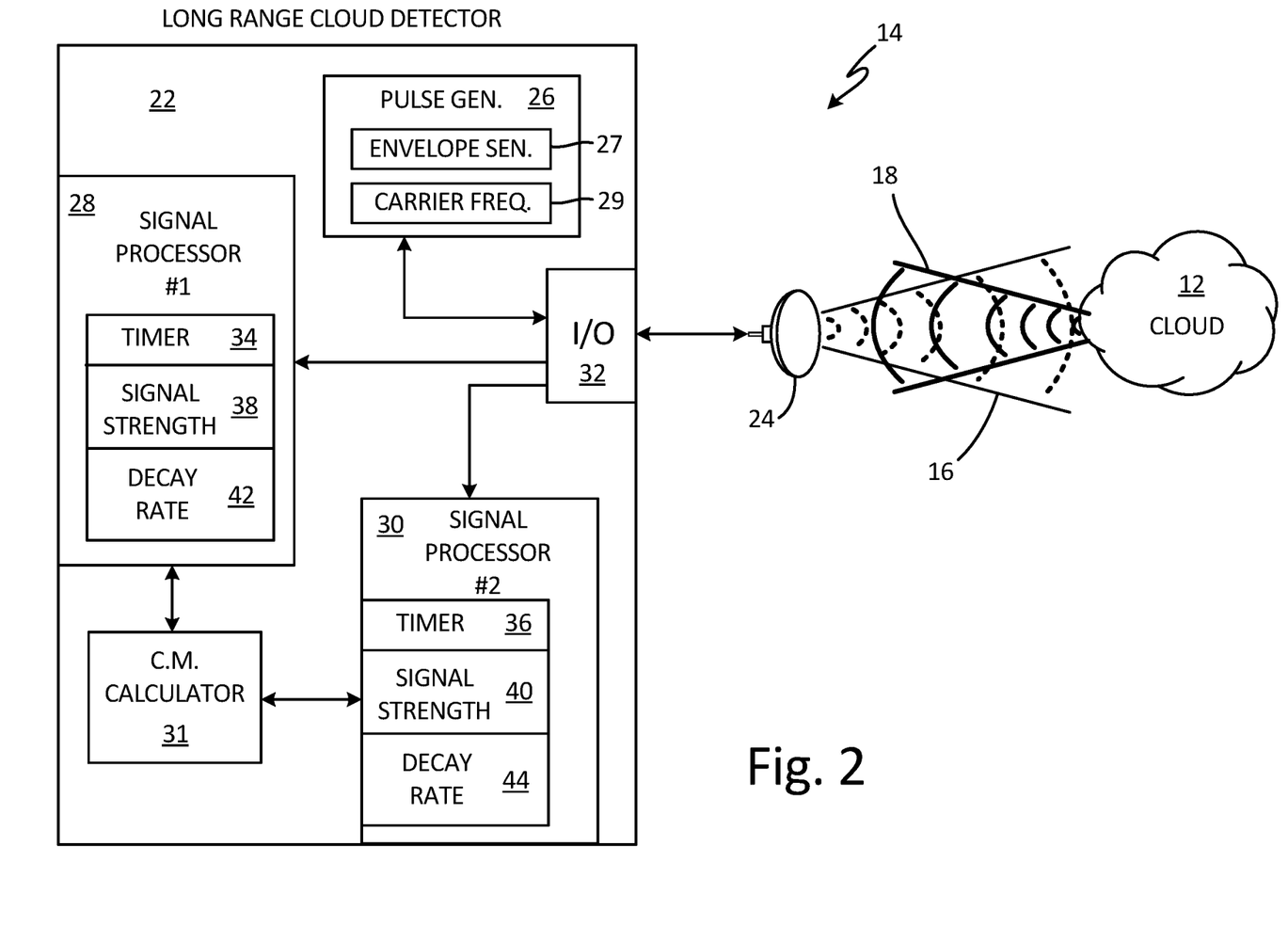
FIG. 2 is a block diagram of an exemplary long-range cloud conditions detector.

FIG. 2 is a block diagram of an exemplary long-range cloud conditions detector. In FIG. 2, long-range cloud conditions detector 14 has control system 22 electrically coupled to antenna 24. Antenna 24 can be a parabolic antenna that is directionally controlled by a gimbaled telescope mechanism, for example. In some embodiments, antenna 24 can be a phased-array antenna that provides directional control by controlling the phase of individual elements of the phased array, for example. Antenna 24 provides for both emission polarization of polarized microwave-frequency electromagnetic pulse 16 as well as polarization-specific sensing of microwave-frequency electromagnetic reflection 18. Microwave-frequency electromagnetic reflection 18 can have different polarization states dependent on whether microwave-frequency electromagnetic reflection 18 is reflected by liquid particles or by ice particles. Thus, polarization-specific sensing can be used to sense both a first polarization and a second polarization of microwave-frequency electromagnetic reflection 18.

Control system 22 includes pulse generator 26, first signal processing channel 28, second signal processing channel 30, cloud metric calculator 31 and Input/Output interface 32. Pulse generator 26 generates an electrical emission signal, that when sent to antenna 24 via input/output interface 32 can generate polarized microwave-frequency electromagnetic pulse 16. Pulse generator 26 includes pulse envelope controller 27 and carrier frequency generator 29. Pulse generator 26 generates the electrical emission signal my multiplying and/or mixing signals generated by pulse envelope controller 27 and carrier frequency generator 29.

Antenna 24 then senses microwave-frequency electromagnetic reflection 18. Microwave-frequency electromagnetic reflection 18 can have a first component of a first polarization and a second component of a second polarization. In some embodiments, additional components of additional polarizations may be included in microwave-frequency electromagnetic reflection 18. Antenna 24 generates first and second electrical detection signals corresponding to the first and second components of sensed microwave-frequency electromagnetic reflection 18, respectively. Some embodiments may generate additional electrical detection signals corresponding to additional components of sensed microwave-frequency electromagnetic reflection 18. Antenna 24 sends the generated detection signals to first and second signal processing channels 28, 30 via Input/Output interface 32. Some embodiments can have additional signal processing channels to process additional generated detection signals.

The first detection signal is received by first signal processing channel 28. The second detection signal is received by second signal processing channel 30. First and second signal processing channels 28, 30 include delay timers 34, 36, signal strength modules 38, 40, and decay rate measurement modules 42, 44, respectively. Delay timers 32, 34 can be configured to generate a signal indicative of a time difference between the electrical emission signal and the received electrical detection signal corresponding to signal processing channels 28, 30. Signal strength measurement modules 38, 40 can be configured to generate a signal indicative of signal strength of the received electrical detection signal. Decay-rate measurement modules 42, 44 can be configured to generate a signal indicative of a rate of decay of the received electrical detection signal.

Generated wave parameters of microwave-frequency electromagnetic reflection 18, such as those generated by delay timer 34, 36, signal strength modules 38, 40, and decay rate measurement modules 42, 44, are communicated to cloud metric calculator 31. Cloud metric calculator 31 calculates various cloud metrics using the received wave parameters.

Some examples of how these wave parameters can be used to calculate various cloud metrics are disclosed by Ray et al. in U.S. published application 2013/0103317, filed Oct. 25, 2011, titled "Methods of Determining the Liquid Water Content of a Cloud," the entire disclosure (henceforth referred to as "the '317 publication") of which is hereby incorporated by reference. Signal strength and a decay rate can be used to calculate a backscatter coefficient and an optical extinction coefficient, for example.

In the '317 publication, the model equation is given by:

$$N(R)=\beta e^{-2\alpha R} \quad (1)$$

Here, N(R) is the normalized corrected echo intensities as a function of range R. Range R can be correlated to time in the microwave-frequency electromagnetic reflection 18, as increasing time of reflection is indicative of a reflection from an increasing range. In equation (1), $\beta$ is the backscatter coefficient, and $\alpha$ is the optical extinction coefficient. Because both the backscatter coefficient $\beta$ and the optical extinction coefficient $\alpha$ are unknown coefficients to be fit to microwave-frequency electromagnetic reflection 18, at least two wave parameter values must be supplied by signal processing channel 28 or 30. For example, signal strength and a decay rate can be sufficient to obtain both the backscatter coefficient $\beta$ and the optical extinction coefficient $\alpha$.

Another example of a cloud metric that can be calculated from the wave parameters is an ice/liquid ratio of the water droplets in a cloud. An ice/liquid ratio can be determined, as disclosed by Ray et al. in U.S. Pat. No. 7,986,408, filed Nov. 5, 2008, titled "Apparatus and Method for In-Flight Detection of Airborne Water Droplets and Ice Crystals," the entire disclosure (henceforth referred to as "the '408 patent") of which is hereby incorporated by reference. The '408 patent discloses: "Water droplets ideally act like perfect mirrors and scatter the reflected laser light back on itself without altering the polarization state. If the incident light is horizontally or vertically polarized, the reflected light is likewise horizontally or vertically polarized. Therefore, a backscatter polarization with a relatively low degree of depolarization is indicative of a liquid water cloud. In the case of circular polarization, the direction of the rotating electric field does not change upon reflection, but the change in Poynting vector of the incident wave changes the sense of circular polarization. Hence, an incident beam which is right hand circularly polarized becomes left hand circularly polarized upon reflection, and vice versa." (Col. 4, lines 4-24). Thus a ratio of reflected light of left-hand circular polarity to reflected light of right-hand circular polarity can be indicative of an ice/liquid ratio of cloud water droplets.

Ice crystals, on the other hand, tend to alter the polarization state of reflected light, due in part to multiple internal reflections from their facets and in part to the birefringence of ice. Reflected light from airborne ice crystals becomes a mixture of different polarization states when the incident light is a known polarization state. By monitoring these different polarization states of the backscattered light, it is possible to distinguish water droplets from ice crystals. In some embodiments circular polarization states may be monitored. In some embodiments various linear polarization states may be monitored. In some embodiments both linear and circular polarization states may be monitored.

Figure 3:
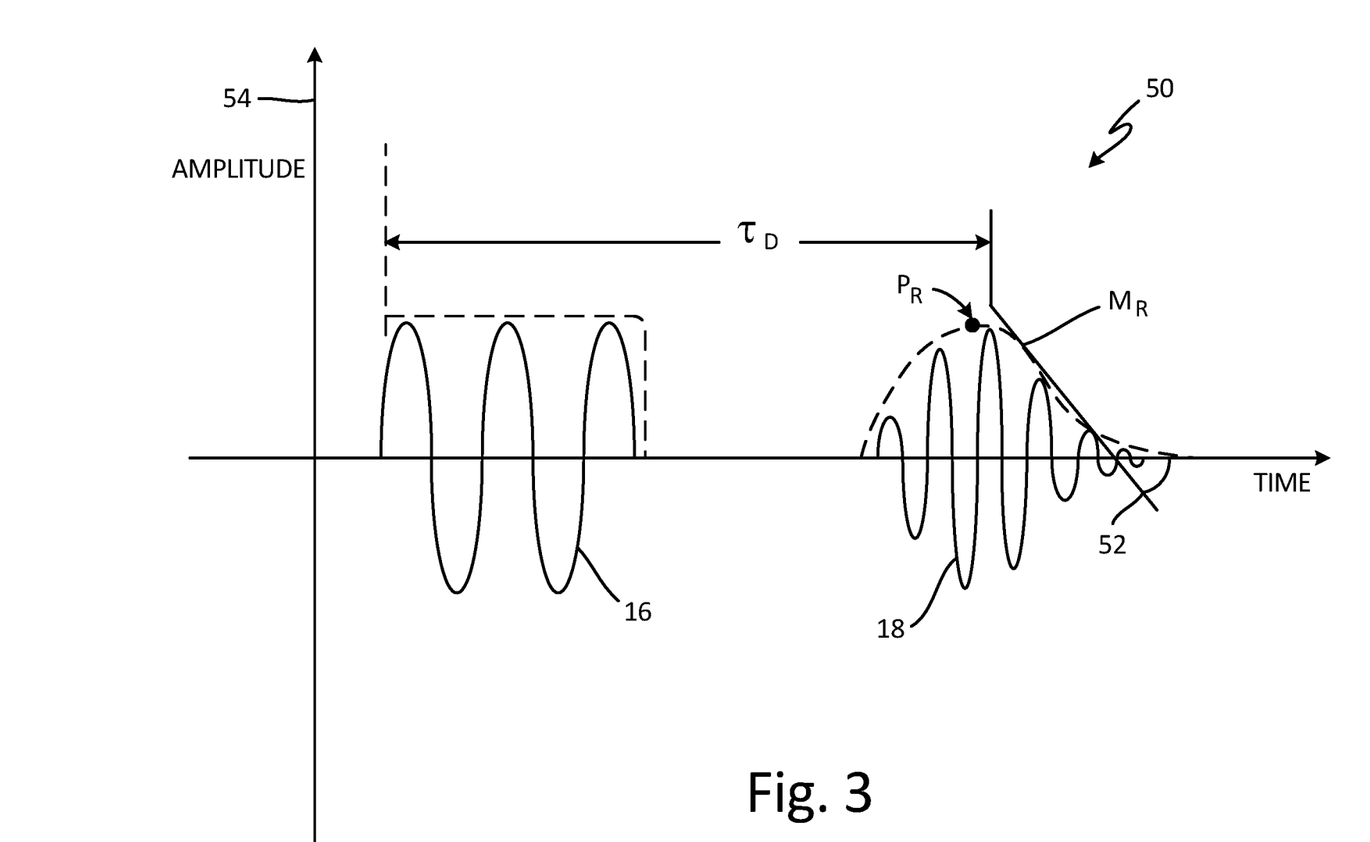
FIG. 3 is a graph of an exemplary polarized microwave-frequency electromagnetic pulse and a corresponding reflected polarized microwave-frequency electromagnetic wave.

FIG. 3 is a graph of an exemplary polarized microwave-frequency electromagnetic pulse and a corresponding reflected polarized microwave-frequency electromagnetic reflection. In FIG. 3, graph 50 has horizontal axis 52, which is indicative of time, and vertical axis 54 which is indicative of amplitude. Polarized microwave-frequency electromagnetic pulse 16 emitted by antenna 24 is plotted on graph 50. Polarized microwave-frequency electromagnetic pulse 16 is a short duration pulse of microwave-frequency radiation. The polarization of polarized microwave-frequency electromagnetic pulse 16 is not depicted in graph 50. The polarization of polarized microwave-frequency electromagnetic pulse 16 is determined by the configuration of emitting antenna 24. Polarized microwave-frequency electromagnetic pulse 16 can be vertically polarized, horizontally polarized, left-hand circularly polarized or right-hand circularly polarized, for example.

Also plotted on graph 50 is microwave-frequency electromagnetic reflection 18 sensed by antenna 24. Similar to the polarized microwave-frequency electromagnetic pulse 16, the polarization of microwave-frequency electromagnetic reflection 18 is not depicted in graph 50. The polarization of microwave-frequency electromagnetic reflection 18 is determined by the configuration of detecting antenna 24. Microwave-frequency electromagnetic reflection 18 is sensed a delay time $\tau_d$ after polarized microwave-frequency electromagnetic pulse 16 was emitted. In the depicted embodiment, delay time $\tau_d$ is measured from the time that polarized microwave-frequency electromagnetic pulse 16 is first emitted to Peak $P_R$ of microwave-frequency electromagnetic reflection 18. Decay rate $m_R$ of microwave-frequency electromagnetic reflection 18 is also depicted on graph 50. Carrier frequencies of both polarized microwave-frequency electromagnetic pulse 16 and microwave-frequency electromagnetic reflection 18 can be between 3 GHz and 30 GHz.

In some embodiments, antenna 24 can simultaneously sense both of two dissimilarly polarized components of microwave-frequency electromagnetic reflection 18. In some embodiments, antenna 24 can only sense one of the two dissimilarly polarized components at a time. In such embodiments, either a second antenna may be employed to provide sensing for both polarizations, or the emitted pulse may be repeated with the antenna pointing in the same direction while the sensing in configured alternately for each polarization.

Figure 4:
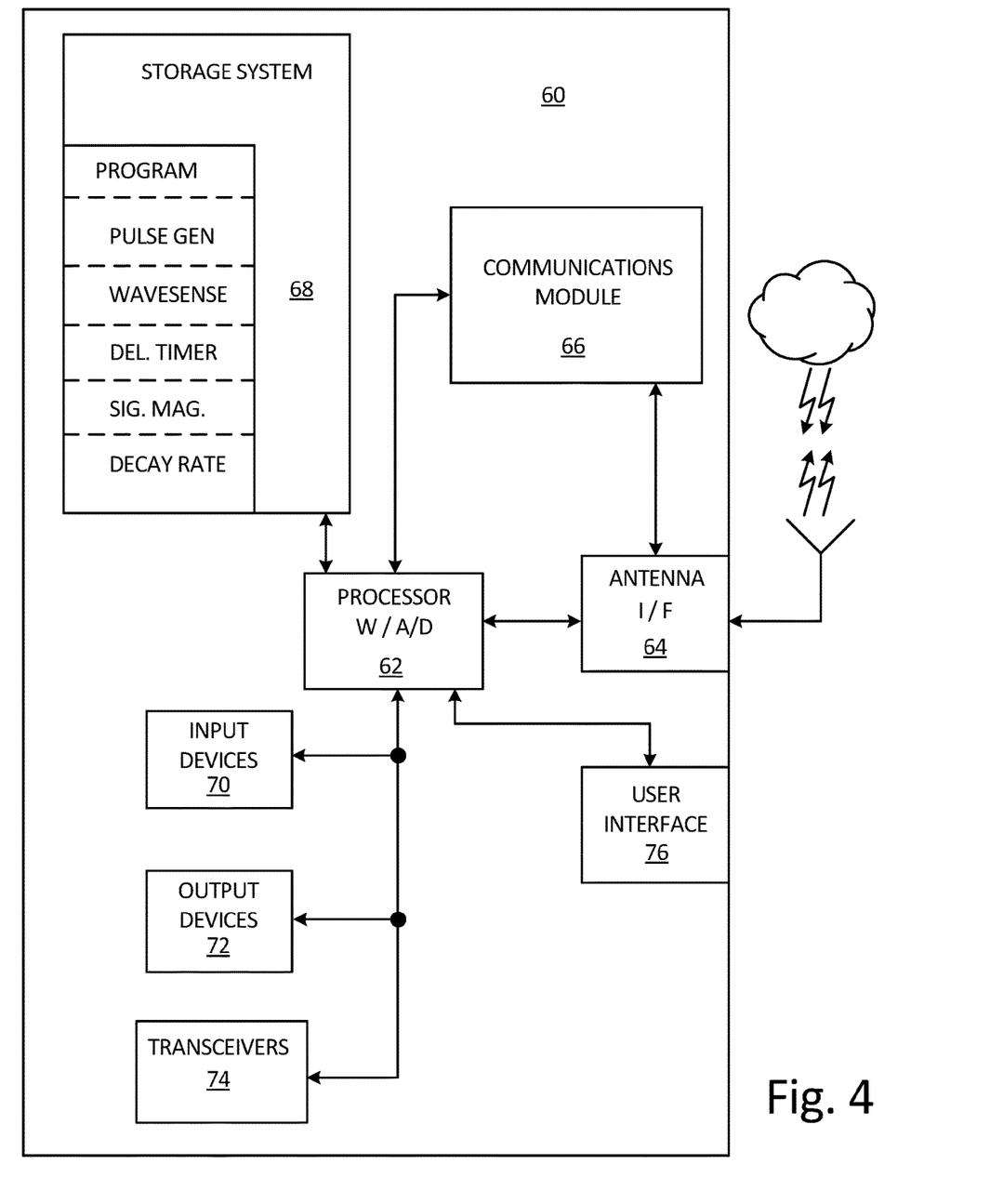
FIG. 4 is a block diagram of an exemplary long-range cloud conditions detection system.

FIG. 4 is a block diagram of an exemplary long-range cloud conditions detection system. In FIG. 4, long-range cloud conditions detector 14 is depicted in an alternative block diagram configuration. In the depicted configuration, long-range cloud conditions detector 14 includes antenna 24 coupled to device 60 that can implement long-range could conditions detection. Device 60 can be any device capable of executing computer-readable instructions defining a software program implementing long-range cloud conditions detection. Examples of device 60 can include, but are not limited to, laptop computers, mobile phones (including smartphones), tablet computers, personal digital assistants (PDAs), desktop computers, servers, mainframes, or other computing devices. In some examples, device 42 can be an avionics unit configured for use on an aerial vehicle, such as a helicopter, unmanned aerial vehicle (UAV), or other aircraft.

As illustrated in FIG. 4, device 60 includes processor 62, antenna interface 64, communications module 66, storage system 68, input devices 70, output devices 72, transceivers 74, and user interface 76. However, in certain examples, device 60 can include more or fewer components. For instance, in examples where device 60 is an avionics unit, device 60 may not include input device(s) 70 and/or output device(s) 72. In some examples, such as where device 60 is a mobile or portable device such as a laptop computer, device 60 may include additional components such as a battery that provides power to components of device 60 during operation.

Processor(s) 62, in one example, are configured to implement functionality and/or process instructions for execution within device 60. For instance, processor(s) 62 can be capable of processing instructions stored in storage device(s) 68. Examples of processor(s) 62 can include any one or more of a microprocessor, a controller, a digital signal processor (DSP), an application specific integrated circuit (ASIC), a field-programmable gate array (FPGA), or other equivalent discrete or integrated logic circuitry.

Storage device(s) 68 can be configured to store information within device 60 during operation. Storage device(s) 68, in some examples, are described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, storage device(s) 68 are a temporary memory, meaning that a primary purpose of storage device(s) 68 is not long-term storage. Storage device(s) 68, in some examples, are described as volatile memory, meaning that storage device(s) 68 do not maintain stored contents when power to device 60 is turned off. Examples of volatile memories can include random access memories (RAM), dynamic random access memories (DRAM), static random access memories (SRAM), and other forms of volatile memories. In some examples, storage device(s) 68 are used to store program instructions for execution by processor(s) 62. Storage device(s) 68, in one example, are used by software or applications running on device 60 (e.g., a software program implementing long-range cloud conditions detection) to temporarily store information during program execution.

Storage device(s) 68, in some examples, also include one or more computer-readable storage media. Storage device(s) 68 can be configured to store larger amounts of information than volatile memory. Storage device(s) 68 can further be configured for long-term storage of information. In some examples, storage device(s) 68 include non-volatile storage elements. Examples of such non-volatile storage elements can include magnetic hard discs, optical discs, flash memories, or forms of electrically programmable memories (EPROM) or electrically erasable and programmable (EEPROM) memories. Storage device(s) 68 can include program segments 76, pulse generator segment 78, wave sense segment 80, delay timing segment 82, signal magnitude measurement segment 84, and decay rate measurement segment 86.

Device 60, in some examples, also includes communications module 66. Device 60, in one example, utilizes communications module 66 to communicate with external devices via one or more networks, such as one or more wireless or wired networks or both. Communications module 66 can be a network interface card, such as an Ethernet card, an optical transceiver, a radio frequency transceiver, or any other type of device that can send and receive information. Other examples of such network interfaces can include Bluetooth, 3G, 4G, and WiFi radio computing devices as well as Universal Serial Bus (USB).

In some embodiments, communications module 66 includes modulation and/or mixing circuitry for generation of polarized microwave-frequency electromagnetic pulse 16 (depicted in FIG. 3). In some embodiments, communications module 66 includes signal detection circuitry configured to detect microwave-frequency electromagnetic reflection 18 (shown in FIG. 3). Communications module 66 is electrically connected to antenna interface 64 so that communications module 66 can communicate polarized microwave-frequency electromagnetic pulse 16 and/or microwave-frequency electromagnetic reflection 18 with antenna interface 64.

Device 60, in some examples, also includes input device(s) 70. Input device(s) 70, in some examples, are configured to receive input from a user. Examples of input device(s) 70 can include a mouse, a keyboard, a microphone, a camera device, a presence-sensitive and/or touch-sensitive display, or other type of device configured to receive input from a user. In some embodiments, input and output communication with the aircraft can be performed via a communications bus, such as, for example, an Aeronautical Radio, Incorporated (ARINC) standard communications protocol.

Output device(s) 72 can be configured to provide output to a user. Examples of output device(s) 72 can include a display device, a sound card, a video graphics card, a speaker, a cathode ray tube (CRT) monitor, a liquid crystal display (LCD), a light emitting diode (LED) display, an organic light emitting diode (OLED) display, or other type of device for outputting information in a form understandable to users or machines.

Accordingly, device 60 illustrates one example embodiment of a device that can execute a software program including a plurality of segments that each includes one or more modules implementing an interface that enables direct communication between the respective module and modules that are members of any other of the plurality of segments.

Figure 5:
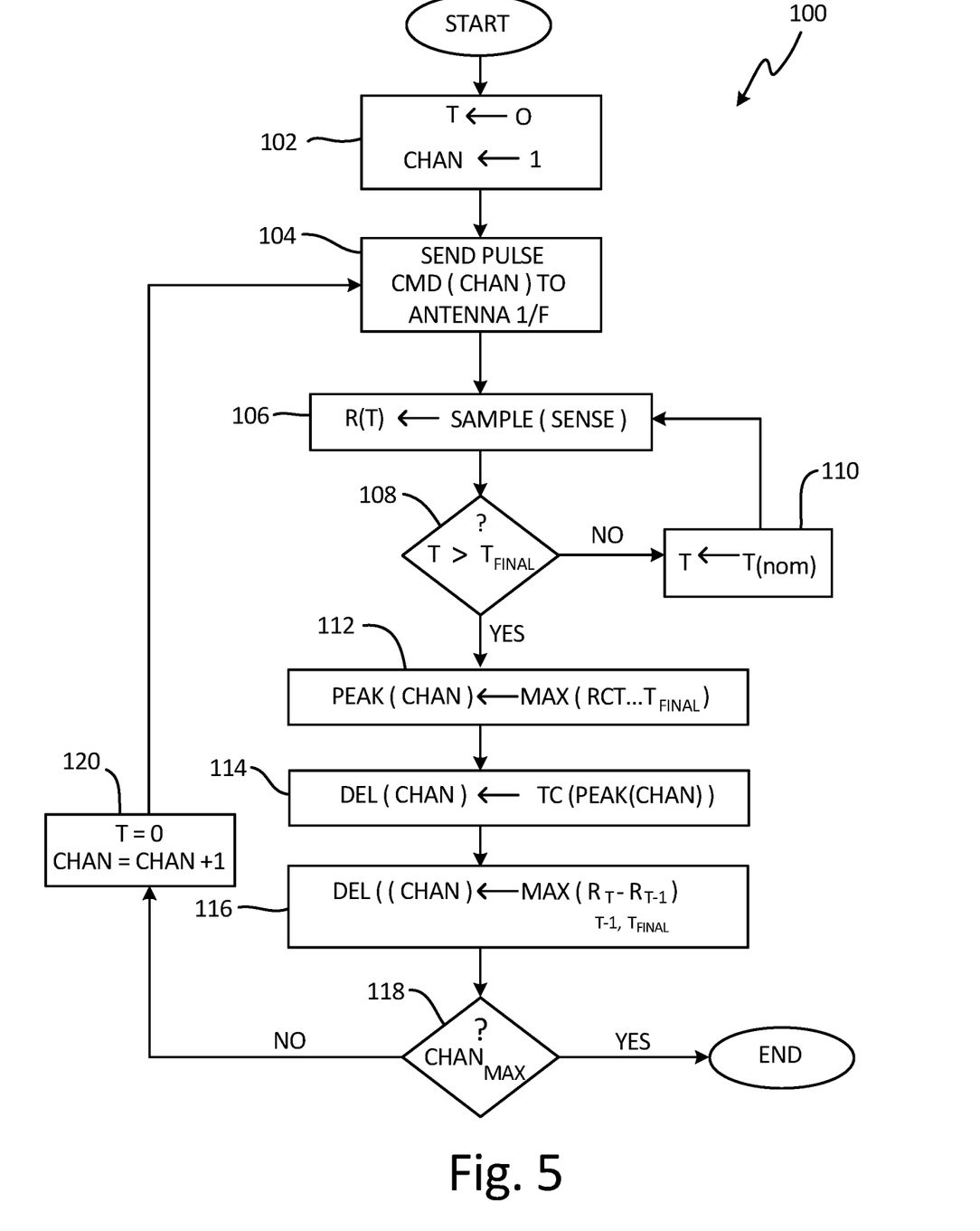
FIG. 5 is a flow chart of an exemplary method of detecting cloud conditions from a distance.

FIG. 5 is a flow chart of an exemplary method of detecting cloud conditions from a distance. In FIG. 5, method 100 is depicted from the vantage point of processor 62 of FIG. 4. Method 100 begins at step 102 with processor 62 initializing timer T to zero and channel CHAN to 1. Then, at step 104, processor 62 sends pulse command CMD (CHAN) to antenna interface 64 and/or communications module 66. At step 106, processor 62 samples the sensed electromagnetic reflection and stores in reflected signal R(T). Then at step 108, processor compares the timer T to a predetermined final time $T_{FINAL}$. If the timer T is not greater than $T_{FINAL}$, then method 100 proceeds to step 110 where processor 62 updates timer T to current time $T_{NOW}$. Method 100 proceeds from step 110 and returns to step 106 at which step processor again samples the sensed electromagnetic reflection. If, at step 108, however, the timer T is greater than $T_{FINAL}$, then method 100 proceeds to step 112 where processor 62 calculates a peak PEAK(CHAN) of reflected signal R(T). Then at step 114, processor 62 calculates a delay time DEL (CHAN) between CMD(CHAN) and PEAK(CHAN). Then at step 116, processor 62 calculates a decay rate DECAY (CHAN) by finding the maximum decay slope between adjacent samples of reflected signal R(T). The method then proceeds to step 118 at which step processor 62 compares channel CHAN with 2. If CHAN equals $CHAN_{MAX}$, then the method ends. If, however CHAN is not equal to 2, then method 100 proceeds to step 120, at which step processor initializes timer T to zero and increments channel CHAN by 1 and the returns to step 104 to send another pulse command to antenna. Channels one and two can differ from one another in a polarization of sensed electromagnetic reflection, for example.

In some embodiments, multiple cloud scans can be performed using different carrier frequencies. For example a first carrier frequency may have a first wavelength that corresponds to electromagnetic waves having a relatively low water absorption coefficient. A second carrier frequency may have a second wavelength that corresponds to electromagnetic waves having a relatively high water absorption coefficient. In some embodiments a ratio between the water absorption coefficients of two carrier frequencies may be greater than two. In some embodiments the ratio may be greater than five. Using wave parameters from both of such cloud scans, additional cloud metrics can be determined. For example, droplet size distributions can be facilitated by using multiple carrier frequencies.

In some embodiments, a carrier frequency of microwave-frequency electromagnetic reflection 18 can be measured. The measured carrier frequency can be compared with a carrier frequency of polarized microwave-frequency electromagnetic pulse 16. A difference between the carrier frequencies of the microwave-frequency electromagnetic pulse and reflection can be determined. The determined difference in carrier frequencies can be used to indicate cloud velocity relative to an aircraft in a direction of emission/detection. Such a relative velocity measurement may be called measurement of a Doppler shift of a carrier frequency. Measuring the Doppler shift of the carrier frequency can indicate the relative movement of atmospheric conditions. Such information can facilitate a pilots navigational decisions. For example, knowing the relative movement of potentially dangerous cloud conditions can assist a pilot in navigating around such clouds.

In some embodiments, various other aircraft measurements can be used in conjunction with those measurements obtained using long-range cloud conditions detector 14. For example, Radio Frequency (RF) type measurements can be used with other current aircraft standard measurements such as air speed, altitude, temperature, pressure, and angle of attack. Various atmospheric metrics can be calculated using such combinations of measurements as is disclosed herein and in the '317 publication and in the '408 patent, herein incorporated by reference.

The following are non-exclusive descriptions of possible embodiments of the present invention.

A long-range cloud conditions detector includes a pulse generator configured to generate an electrical emission signal. The long-range cloud conditions detector includes a polarizing antenna electrically coupled to the pulse generator. The polarizing antenna configured to emit a polarized microwave-frequency electromagnetic pulse in response to receiving, from the pulse generator, the electrical emission signal. The polarizing antenna is configured to sense a microwave-frequency electromagnetic reflection corresponding to the emitted polarized microwave-frequency electromagnetic pulse reflected by a cloud. The microwave-frequency electromagnetic reflection has a first component of a first polarization and a second component of a second polarization different from the first polarization. The polarizing antenna is configured to generate first and second electrical detection signals corresponding to the first and second components of the sensed microwave-frequency electromagnetic reflection, respectively. The long-range cloud conditions detector includes first and second signal-processing channels, each electrically coupled to the polarizing antenna. The first and second signal-processing channels are configured to receive, from the polarizing antenna, the first and second detection signals, respectively. Each of the first and second signal-processing channels includes a pulse/reflection delay timer configured to generate a signal indicative of a time difference between the electrical emission signal and the received electrical detection signal. Each of the first and second signal-processing channels includes a signal strength module configured to generate a signal indicative of a signal strength of the received electrical detection signal. Each of the first and second signal-processing channels also includes a decay-rate module configured to generate a signal indicative of a rate of decay of the received electrical detection signal.

A further embodiment of the foregoing long-range cloud conditions detector, wherein each of the first and second detection channels can further include a Doppler module configured to generate a signal indicative of movement of the cloud relative to the polarizing antenna. The signal can be based on a carrier frequency difference between the electrical emission signal and the received electrical detection signal.

A further embodiment of any of the foregoing long-range cloud conditions detectors, wherein the electrical emission signal can be a first electrical emission signal having a first carrier frequency. The pulse generator can be further configured to generate a second electrical emission signal having a second carrier frequency. The first carrier frequency can correspond to a first water absorption coefficient and the second carrier frequency can correspond to a second water absorption coefficient different from the first water absorption coefficient. A further embodiment of any of the foregoing long-range cloud conditions detectors, wherein a ratio of the first water absorption coefficient to the second water absorption coefficient can be greater than or equal to a threshold value.

A further embodiment of any of the foregoing long-range cloud conditions detectors, wherein the polarized microwave-frequency electromagnetic pulse can be a first polarized microwave-frequency electromagnetic pulse, and the microwave-frequency electromagnetic reflection can be a first microwave-frequency electromagnetic reflection. The polarizing antenna can be further configured to: i) emit a second polarized microwave-frequency electromagnetic pulse in response to receiving, from the pulse generator, the second electrical emission signal; ii) sense a second microwave-frequency electromagnetic reflection corresponding to the emitted second polarized microwave-frequency electromagnetic pulse reflected by the cloud; and iii) generate third and fourth electrical detection signals corresponding to the third and fourth components of the sensed second microwave-frequency electromagnetic reflection, respectively. The polarization and the fourth microwave-frequency electromagnetic reflection can have the second polarization.

Any of the foregoing long-range cloud conditions detectors can optionally include, additionally and/or alternatively, a processor configured to calculate, based on the signal indicative of the rate of decay, a signal extinction coefficient. The processor can be further configured to calculate, based on the signal indicative of the signal strength and the signal indicative of the rate of decay, a backscatter coefficient.

The long-range cloud conditions detector of claim 7, further comprising a processor configured to calculate, based on a ratio of a first calculation based on signals generated by the first and/or second signal-processing channels to a second calculation based on signals generated by the third and/or fourth signal-processing channels, an ice/liquid ratio of the cloud.

A further embodiment of any of the foregoing long-range cloud conditions detectors, wherein the carrier frequency is between 3 GHz and 30 GHz. A further embodiment of any of the foregoing long-range cloud conditions detectors, wherein the polarized microwave-frequency electromagnetic pulse is circularly polarized, and wherein the first polarization is left-hand circular polarization and the second polarization is right-hand circular polarization. A further embodiment of any of the foregoing long-range cloud conditions detectors, wherein the polarized microwave-frequency electromagnetic pulse is linearly polarized, and wherein the first polarization is vertical polarization and the second polarization is horizontal polarization.

A long-range cloud conditions detector includes a pulse generator configured to generate an electrical emission signal. A long-range cloud conditions detector includes a polarizing antenna electrically coupled to the pulse generator. The polarizing antenna is configured to: i) emit a polarized microwave-frequency electromagnetic pulse in response to receiving, from the pulse generator, the electrical emission signal; ii) sense a microwave-frequency electromagnetic reflection corresponding to the emitted polarized microwave-frequency electromagnetic pulse reflected by a cloud, the microwave-frequency electromagnetic reflection having a polarization; and iii) generate a electrical detection signal corresponding to the sensed microwave-frequency electromagnetic reflection. The long-range cloud conditions detector also includes a signal-processing channel electrically coupled to the polarizing antenna. The signal-processing channel is configured to receive, from the polarizing antenna, the electrical detection signal. The signal-processing channel includes: i) a pulse/reflection delay timer configured to generate a signal indicative of a time difference between the electrical emission signal and the received electrical detection signal; ii) a signal strength module configured to generate a signal indicative of a signal strength of the received electrical detection signal; iii) a decay-rate module configured to generate a signal indicative of a rate of decay of the received electrical detection signal; and iv) a liquid water content module configured to calculate a liquid water content of the cloud, based on the signal indicative of the rate of decay and the signal indicative of the signal strength.

A method of determining conditions of a distant cloud includes emitting a polarized microwave-frequency electromagnetic pulse at the cloud. The method includes sensing first and second microwave-frequency electromagnetic reflections each corresponding to the emitted polarized microwave-frequency electromagnetic pulse reflected by a cloud. The first microwave-frequency electromagnetic reflection has a first polarization and the second microwave-frequency electromagnetic reflection having a second polarization different from the first polarization. The method includes determining a time difference between the emitted polarized microwave-frequency electromagnetic pulse and the sensed first and/or second microwave-frequency electromagnetic reflections. The method includes determining a signal strength of the sensed first and/or second microwave-frequency electromagnetic reflections. The method also includes determining a rate of decay of the sensed first and/or second microwave-frequency electromagnetic reflections.

The method of the preceding paragraph can optionally include, additionally and/or alternatively, any one or more of the following features, configurations and/or additional components: i) calculating, based on the determined rate of decay, an optical extinction coefficient of the sensed first and/or second microwave-frequency electromagnetic reflections; ii) calculating, based on the calculated optical extinction coefficient, a density of particles in the cloud; iii) calculating, based on the determined signal strength and the determined rate of decay, a backscatter coefficient of the sensed first and/or second microwave-frequency electromagnetic reflections; iv) calculating, based on the calculated backscatter coefficient, a droplet size distribution in the cloud; v) scanning the emitted polarized microwave-frequency electromagnetic pulse over a solid angle portion of space.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A long-range cloud conditions detector comprising:
a pulse generator configured to generate an electrical emission signal pulse;
a polarizing antenna electrically coupled to the pulse generator, the polarizing antenna configured to:
emit a polarized microwave-frequency electromagnetic pulse in response to receiving, from the pulse generator, the electrical emission signal pulse;
sense a microwave-frequency electromagnetic reflection pulse corresponding to the emitted polarized microwave-frequency electromagnetic pulse reflected by a cloud, the microwave-frequency electromagnetic reflection pulse having a first component of a first polarization and a second component of a second polarization different from the first polarization; and generate first and second electrical detection signals pulses corresponding to the first and second components of the sensed microwave-frequency electromagnetic reflection pulse, respectively; and
first and second signal-processing channels, each electrically coupled to the polarizing antenna, the first and second signal-processing channels configured to receive, from the polarizing antenna, the first and second detection signals pulses, respectively, each of the first and second signal-processing channels including:
a pulse/reflection delay timer configured to generate a signal indicative of a time difference between the electrical emission signal pulse and the received electrical detection signal pulse;
a signal strength module configured to generate a signal indicative of a signal strength of the received electrical detection signal pulse; and
a decay-rate module configured to generate a signal indicative of a rate of pulse decay of the received electrical detection signal pulse; and
a liquid water content module configured to calculate a liquid water content of the cloud, based on the signal indicative of the rate of pulse decay and the signal indicative of the signal strength.

2. The long-range cloud conditions detector of claim 1, wherein each of the first and second detection channels further includes:
a Doppler module configured to generate a signal indicative of movement of the cloud relative to the polarizing antenna, the signal based on a carrier frequency difference between the electrical emission signal pulse and the received electrical detection signal pulse.

3. The long-range cloud conditions detector of claim 1, wherein the electrical emission signal pulse is a first electrical emission signal pulse having a first carrier frequency, and wherein the pulse generator is further configured to:
generate a second electrical emission signal pulse having a second carrier frequency, wherein the first carrier frequency corresponds to a first water absorption coefficient and the second carrier frequency corresponds to a second water absorption coefficient different from the first water absorption coefficient.

4. The long-range cloud conditions detector of claim 3, wherein a ratio of the first water absorption coefficient to the second water absorption coefficient is greater than or equal to a threshold value.

5. The long-range cloud conditions detector of claim 3, wherein the polarized microwave-frequency electromagnetic pulse is a first polarized microwave-frequency electromagnetic pulse, and the microwave-frequency electromagnetic reflection pulse is a first microwave-frequency electromagnetic reflection pulse, wherein the polarizing antenna is further configured to:
emit a second polarized microwave-frequency electromagnetic pulse in response to receiving, from the pulse generator, the second electrical emission signal pulse;
sense a second microwave-frequency electromagnetic reflection pulse corresponding to the emitted second polarized microwave-frequency electromagnetic pulse reflected by the cloud, the second microwave-frequency electromagnetic reflection pulse having a third component of the first polarization and a fourth component of the second polarization different from the first polarization; and
generate third and fourth electrical detection signals pulses corresponding to the third and fourth components of the sensed second microwave-frequency electromagnetic reflection pulse, respectively.

6. The long-range cloud conditions detector of claim 5, further comprising:
third and fourth signal-processing channels, each electrically coupled to the polarizing antenna, the third and fourth signal-processing channels configured to receive, from the polarizing antenna, the third and fourth detection signals pulses, respectively, each of the third and fourth signal-processing channels including:
a pulse/reflection delay timer configured to generate a signal indicative of a time difference between the second electrical emission signal pulse and the received electrical detection signal pulse;
a signal strength module configured to generate a signal indicative of a signal strength of the received electrical detection signal pulse; and
a decay-rate module configured to generate a signal indicative of a rate of pulse decay of the received electrical detection signal pulse.

7. The long-range cloud conditions detector of claim 1, wherein the signal strength module is a peak detector.

8. The long-range cloud conditions detector of claim 1, wherein the polarizing antenna is a phased array antenna.

9. The long-range cloud conditions detector of claim 3, wherein the polarized microwave-frequency electromagnetic pulse is a first polarized microwave-frequency electromagnetic pulse and the polarizing antenna is a first polarizing antenna, wherein the long-range cloud conditions detector further comprises:
a second polarizing antenna electrically coupled to the pulse generator, the second polarizing antenna configured to:
emit a second polarized microwave-frequency electromagnetic pulse in response to receiving, from the pulse generator, the second electrical emission signal pulse;
sense third and fourth microwave-frequency electromagnetic reflections reflection pulses each corresponding to the emitted second polarized microwave-frequency electromagnetic pulse reflected by the cloud, the third microwave-frequency electromagnetic reflection pulse having the first polarization and the fourth microwave-frequency electromagnetic reflection pulse having the second polarization; and
generate third and fourth electrical detection signals pulses corresponding to the sensed third and fourth microwave-frequency electromagnetic reflections reflection pulses, respectively.

10. The long-range cloud conditions detector of claim 1, further comprising a processor configured to: i) calculate, based on the signal indicative of the rate of pulse decay, a signal extinction coefficient; and ii) calculate, based on the signal indicative of the signal strength and the signal indicative of the rate of pulse decay, a backscatter coefficient.

11. The long-range cloud conditions detector of claim 7, further comprising a processor configured to calculate, based on a ratio of a first calculation based on signals generated by the first and/or second signal-processing channels to a second calculation based on signals generated by the third and/or fourth signal-processing channels, an ice/liquid ratio of the cloud.

12. The long-range cloud conditions detector of claim 1, wherein the carrier frequency is between 3 GHz and 30 GHz.

13. The long-range cloud conditions detector of claim 1, wherein the polarized microwave-frequency electromagnetic pulse is circularly polarized, and wherein the first polarization is left-hand circular polarization and the second polarization is right-hand circular polarization.

14. The long-range cloud conditions detector of claim 1, wherein the polarized microwave-frequency electromagnetic pulse is linearly polarized, and wherein the first polarization is vertical polarization and the second polarization is horizontal polarization.

15. A long-range cloud conditions detector comprising:
a pulse generator configured to generate an electrical emission signal pulse;
a polarizing antenna electrically coupled to the pulse generator, the polarizing antenna configured to:
emit a polarized microwave-frequency electromagnetic pulse in response to receiving, from the pulse generator, the electrical emission signal pulse;
sense a microwave-frequency electromagnetic reflection pulse corresponding to the emitted polarized microwave-frequency electromagnetic pulse reflected by a cloud, the microwave-frequency electromagnetic reflection pulse having a polarization; and
generate a electrical detection signal pulse corresponding to the sensed microwave-frequency electromagnetic reflection pulse; and
a signal-processing channel electrically coupled to the polarizing antenna, the signal-processing channel configured to receive, from the polarizing antenna, the electrical detection signal pulse, the signal-processing channel including:
a pulse/reflection delay timer configured to generate a signal indicative of a time difference between the electrical emission signal pulse and the received electrical detection signal pulse;
a signal strength module configured to generate a signal indicative of a signal strength of the received electrical detection signal pulse;
a decay-rate module configured to generate a signal indicative of a rate of pulse decay of the received electrical detection signal pulse; and
a liquid water content module configured to calculate a liquid water content of the cloud, based on the signal indicative of the rate of pulse decay and the signal indicative of the signal strength.

16. A method of determining conditions of a distant cloud, the method comprising:
emitting a polarized microwave-frequency electromagnetic pulse at the cloud;
sensing first and second microwave-frequency electromagnetic reflections reflection pulses each corresponding to the emitted polarized microwave-frequency electromagnetic pulse reflected by a cloud, the first microwave-frequency electromagnetic reflection pulse having a first polarization and the second microwave-frequency electromagnetic reflection pulse having a second polarization different from the first polarization;
determining a time difference between the emitted polarized microwave-frequency electromagnetic pulse and the sensed first and/or second microwave-frequency electromagnetic reflections reflection pulses;
determining a signal strength of the sensed first and/or second microwave-frequency electromagnetic reflections reflection pulses; and
determining a rate of pulse decay of the sensed first and/or second microwave-frequency electromagnetic reflections reflection pulses; and calculating, based on the determined rate of pulse decay, an extinction coefficient of the sensed first and/or second microwave-frequency electromagnetic reflection pulses.

17. The method of claim 16, further comprising:
calculating, based on the calculated extinction coefficient, a density of particles in the cloud.

18. The method of claim 16, further comprising:
calculating, based on the determined signal strength and the determined rate of pulse decay, a backscatter coefficient of the sensed first and/or second microwave-frequency electromagnetic reflections reflection pulses.

19. The method of claim 18, further comprising:
calculating, based on the calculated backscatter coefficient, a droplet size distribution in the cloud.

20. The method of claim 16, further comprising:
scanning the emitted polarized microwave-frequency electromagnetic pulse over a solid angle portion of space.

\* \* \* \* \*